United States Patent
Kanodia et al.

(10) Patent No.: US 10,009,156 B2
(45) Date of Patent: *Jun. 26, 2018

(54) SERVICE DIFFERENTIATION AND SERVICE LEVEL AGREEMENTS FOR WIRELESS ACCESS CLIENTS

(71) Applicant: Firetide, Inc., Campbell, CA (US)

(72) Inventors: Sachin Kanodia, San Jose, CA (US); Kota Rathnamaiah Sharath Kumar, Karnataka (IN); Mohan Natarajan, San Ramon, CA (US); Pramod Jathavedan Akkarachittor, Fremont, CA (US)

(73) Assignee: Firetide, Inc., Campbell, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/145,910

(22) Filed: Dec. 31, 2013

(65) Prior Publication Data

US 2014/0348137 A1 Nov. 27, 2014

Related U.S. Application Data

(63) Continuation of application No. 12/812,458, filed as application No. PCT/US2009/030855 on Jan. 13, 2009, now Pat. No. 8,634,293.

(30) Foreign Application Priority Data

Jan. 14, 2008 (IN) .............................. 114/DEL/2008

(51) Int. Cl.
*H04W 4/00* (2018.01)
*H04L 5/00* (2006.01)
(Continued)

(52) U.S. Cl.
CPC ............ *H04L 5/0039* (2013.01); *H04L 47/14* (2013.01); *H04L 47/20* (2013.01);
(Continued)

(58) Field of Classification Search
CPC ...................... H04W 72/0446; H04W 72/0453
See application file for complete search history.

(56) References Cited

U.S. PATENT DOCUMENTS 6,940,824 B2  9/2005  Shibutani
8,634,293 B2 * 1/2014  Kanodia et al. .............. 370/229
(Continued)

FOREIGN PATENT DOCUMENTS

EP      1813063 A2    8/2007
WO   2006055784 A2    5/2006

OTHER PUBLICATIONS

Intellectual Property India, Examination Report for India Application No. 114/DEL/2008, dated May, 5, 2017, 8 pages.

*Primary Examiner* — Kevin C Harper
(74) *Attorney, Agent, or Firm* — PatentVentures; Bennett Smith; Korbin Van Dyke

(57) ABSTRACT

Differentiated services are provided through service level agreements (SLAs) between access nodes and some of the clients using a wireless access network. Client devices include internal devices that are compliant with service-related specifications published by the access nodes. Client devices also may include non-compliant external and legacy devices, as well as outside interferers. The access nodes control target SLAs for each client device. The access nodes and the internal client devices perform rate limiting to ensure that a device's target SLA is adhered to. The service-related specifications include schedules to ensure preferential access for preferred internal client devices. The internal client devices send usage and bandwidth availability feedback to the access node they are associated with, enabling the access node to come up with better schedules for meeting the preferred internal devices' SLAs in view of the network conditions reported via the feedback.

25 Claims, 5 Drawing Sheets

(51) Int. Cl.
*H04L 12/801* (2013.01)
*H04L 12/813* (2013.01)
*H04L 12/851* (2013.01)
*H04L 12/825* (2013.01)
*H04W 28/12* (2009.01)
*H04W 28/24* (2009.01)

(52) U.S. Cl.
CPC .......... *H04L 47/2408* (2013.01); *H04L 47/26* (2013.01); *H04W 28/12* (2013.01); *H04W 28/24* (2013.01)

(56) References Cited

U.S. PATENT DOCUMENTS

| | | | |
|---|---|---|---|
| 2002/0163933 A1* | 11/2002 | Benveniste | 370/465 |
| 2005/0052992 A1* | 3/2005 | Cloonan | H04L 12/5695 370/229 |
| 2008/0170541 A1* | 7/2008 | Vartiainen et al. | 370/328 |
| 2009/0116427 A1* | 5/2009 | Marks et al. | 370/328 |

\* cited by examiner

SERVICE DIFFERENTIATION AND SERVICE LEVEL AGREEMENTS FOR WIRELESS ACCESS CLIENTS

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

U.S. patent application Ser. No. 12/812,458, filed Jul. 11, 2010, now U.S. Pat. No. 8,634,293, entitled SERVICE DIFFERENTIATION AND SERVICE LEVEL AGREEMENTS FOR WIRELESS ACCESS CLIENTS;

International Patent Application No. PCT/US2009/030855, filed Jan. 13, 2009, entitled SERVICE DIFFERENTIATION AND SERVICE LEVEL AGREEMENTS FOR WIRELESS ACCESS CLIENTS;

Indian Standard Patent Application No. 114/DEL/2008, filed Jan. 14, 2008, entitled SERVICE DIFFERENTIATION AND SERVICE LEVEL AGREEMENTS FOR WIRELESS ACCESS CLIENTS.

BACKGROUND

Field

Advancements in wireless access networks are needed to provide improvements in performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Service Level Agreements (SLAs) are a typical way to sell network bandwidth to wired customers. For example, a customer can have an SLA for (up to) 1.5 Mbps of bandwidth. This bandwidth can be total bandwidth (for upstream or downstream) or can be specified as 1 Mbps downstream (from the Internet/the provider to the customer) and 0.5 Mbps upstream (from the customer to the Internet/provider). Generally an SLA limits the maximum bandwidth a customer will receive but it can additionally specify guaranteed minimum bandwidth that a customer would receive (total or upstream and downstream).

SLAs for bandwidth provisions and guarantees are much easier to support in a wired network than in a wireless network because bandwidth on a wire is constant and can be easily controlled. Wireless bandwidth on the other hand varies in both time and space as propagation conditions vary due to climate, changing obstacles in the vicinity of the network, interfering devices, e.g., microwaves interfere with Wi-Fi signals, and the co-location of multiple wireless networks. Interference and co-location are common, especially when unlicensed bands are used.

Wireless access to network services and the Internet is generally provided through a network of wireless access devices, e.g., base stations (in cellular networks), or Access Points (APs) in WLANs, or by wireless mesh nodes who participate in a mesh network in addition to serving clients. Each wireless access device typically transmits and receives traffic within a particular geographic area where coverage is desired. The combination of areas covered by the individual wireless access devices constitutes the coverage area of the network. Customers typically connect to a wireless access network through their laptops, PDAs, CPE (Customer Premises Equipment) devices, phones, etc. These devices are typically referred to as clients with respect to the network. The base stations/APs are interconnected through a network, which may be wireless or wired, and may also interact with a centralized controller, which may be responsible for controlling some of their behavior and configuration. From now on, we would refer to only APs for simplicity. One example of existing networks of this type is an 802.11-style network.

In a wireless access network serving wireless customers on unlicensed bands, e.g., using the 802.11 family of protocols, hard guarantees are impossible to provide as some devices are not within the control of the network operator, e.g., microwaves, cordless phones, baby monitors. Even 802.11 devices may not be willing or able to comply with SLA policies mandated by a particular network even if they are using the services of that network because they may not have the most up-to-date software. Wireless service networks often have to provide service to such legacy clients in addition to clients that have up-to-date software.

REFERENCES

The TCP protocol is described in: Postel, J., "Transmission Control Protocol—DARPA Internet Program Protocol Specification", RFC 793, DARPA, September 1981.

The most up-to-date reference for the 802.11 standard is: IEEE 802.11, 2007 Edition (ISO/IEC 8802-11: 2007) IEEE Standards for Information Technology—Telecommunications and Information Exchange between Systems—Local and Metropolitan Area Network—Specific Requirements—Part 11: Wireless LAN Medium Access Control (MAC) and Physical Layer (PHY) Specification.

All of the aforementioned references are herein incorporated by reference for all purposes.

SYNOPSIS

The invention may be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

Wireless network 5000 of FIG. 5 has a plurality of access nodes (510-1 through 510-5, and as illustrated in FIGS. 3 and 4). Each access node has an associated sub-network having associated client devices (such as laptop 600-1 associated with access node 510-4, and laptop 600-2 associated with access node 510-5). Devices that are either part of the infrastructure of network 5000, or are provided services by it, are considered internal devices with respect to network 5000. Devices that are either part of the infrastructure of another wireless network, or are not provided services by network 5000, are considered external devices with respect to network 5000.

Client devices are non-network-infrastructure devices that are provided services by network-infrastructure devices. In accordance with various usage scenarios, the client devices may include laptops, PDAs, Customer Premises Equipment devices (CPEs), and other types. Client devices provided services by wireless network 5000 are considered internal client devices. Unless otherwise indicated, internal client devices are associated with a single access node of wireless network 5000. As will be discussed in greater detail, each access node of wireless network 5000 publishes service-related specifications to those internal client devices that are associated with the access node. Client devices that are non-compliant or compliant with respect to the published service-related specifications of a particular access node, are respectively considered to be Non-compliant client devices and Compliant client devices with respect to the particular access node. Except for legacy devices, internal client devices associated with the particular access node are Compliant client devices with respect to the particular access node. Legacy internal client devices, associated with a particular access node, but not capable of being compliant, are one example of Non-compliant client devices with respect to the particular access node. Client devices not associated with the particular access node, be they internal or external devices, are another example of Non-compliant client devices with respect to the particular access node.

Each access node sub-network of FIG. 5 is carrying out the processes of FIG. 1. In FIG. 1, differentiated services are provided through a plurality of techniques carried out collectively by each access node and the internal client devices associated with the access node. Based on actual SLAs specified to the access nodes by the network operator/provider pertaining to at least some of the internal client devices, "target SLAs" are ascertained by the access nodes (process 100) that specify the amount of bandwidth that each client device (associated with the access node) is permitted to consume. The access nodes and the internal client devices collectively perform rate limiting (process 200) to ensure that a device's target SLA is adhered to.

For devices having an actual SLA, the target SLA is nominally equal to the actual SLA. However, for a variety of reasons the access nodes may (via process 100) temporarily dynamically adjust the target SLA of a client device to a value (including zero) that may substantially deviate from the device's nominal target SLA (and actual SLA, if any). While a reference to "target SLA" generally refers to the current target SLA, whatever value that may instantaneously be, the term "adjusted target SLA" will sometimes be used to highlight that the current target SLA value is perhaps substantially different than the nominal target SLA value. For example, as will be explained further below, if a certain client device is observed to be inactive, while its nominal target SLA value (and actual SLA, if any) remains unchanged, its adjusted target SLA may be reduced to zero until it returns to being active.

The publication of service-related specifications include the publication of schedules (process 300). Compliant client devices perform their access in accordance with the schedules published by the access node to which they are associated (process 400). In this way, the schedules serve in part to manage contention among various classes of internal client devices. These schedules are also known as schedule maps 2000 (as detailed in FIG. 2) and they also serve in part to provide preferential access for preferred internal client devices.

The compliant client devices associated with an access node send usage and bandwidth availability feedback (process 500) to the access node. The feedback, which reflects network conditions (including bandwidth realized and contention experienced), enables the access node to raise or lower the enforced bandwidths (the target SLAs) for certain of the Compliant devices in order to insure that actual SLAs for other devices are met. The access node does this by developing better schedules (schedule maps) that act to both better manage contention and to reproportion access opportunities.

GLOSSARY

Internal device: devices that are part of the wireless network that is the focus of interest. May include APs, client devices, and internal legacy client devices.

Interferer: a device acting as the source of any emission or transmission that causes interference with the communication of another device. In addition to outside interferers, a first internal device is generally at times an interferer from the perspective of a second internal device.

Outside interferers: devices generating emissions in the same frequency band either unintentionally (e.g. via harmonics), or in conjunction with a different service (modulation/channel scheme) operating in the same band. Examples of outside interferers include: microwaves, cordless phones, and baby monitors.

External device: devices that are not part of the wireless network that is the focus of interest. E.g., these are wireless devices that might be part of another wireless network in the same vicinity. As such, external devices may be "interferers" as well as a source of contention.

Client device: internal or external non-network-infrastructure devices. When they are internal devices, they are the devices served by the network that is the focus of interest.

Compliant device: internal devices directly responsive to control by the network operator/provider. Includes access nodes and client devices other than internal legacy devices.

Conformant device: a device using a conformant protocol, such as TCP. A conformant internal legacy device is not considered a compliant device, even though it may be indirectly responsive to control.

Legacy device: unless further qualified, includes internal legacy devices and external legacy devices.

Internal legacy device: a non-compliant internal client device that is either unwilling or unable to be directly responsive to control by the network operator/provider. A client device falls into the legacy device category generally because it does not have the latest software.

Figure 1:
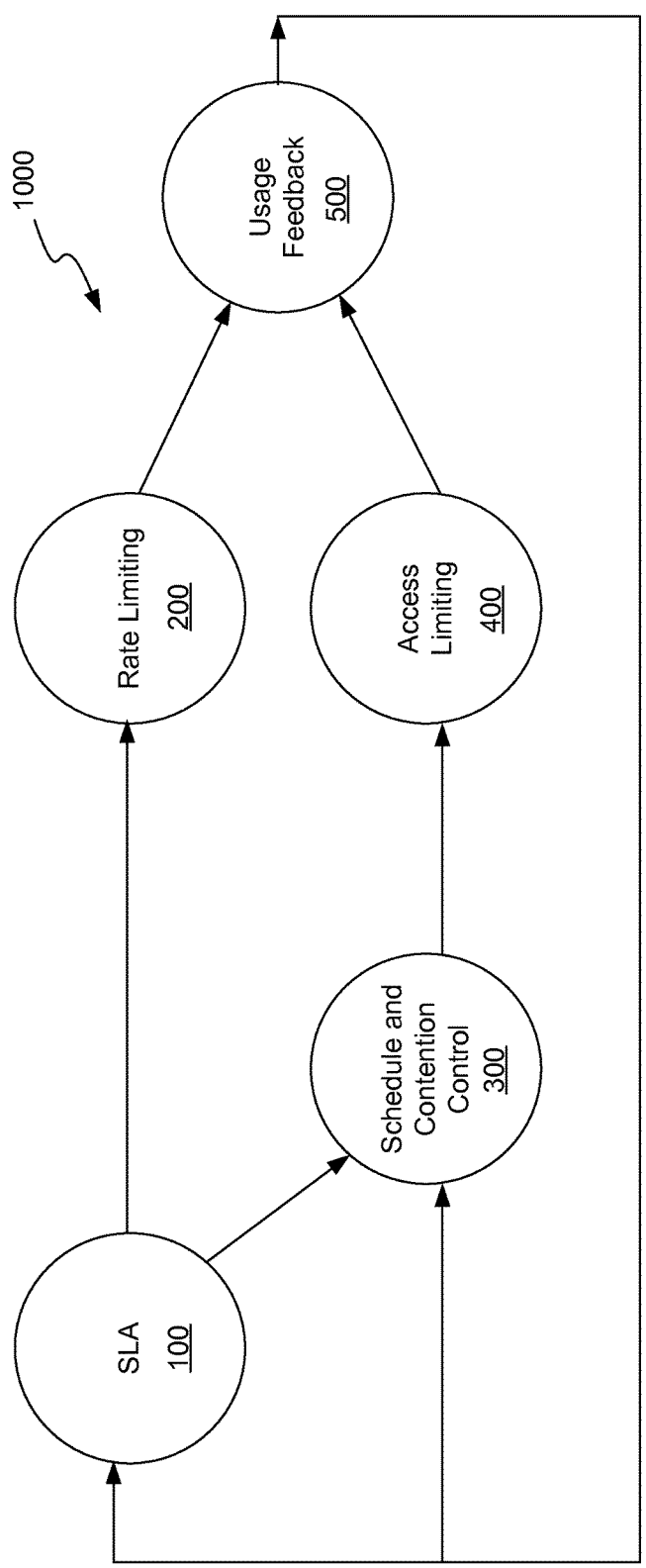
FIG. 1 illustrates selected details of an embodiment for providing differentiated services in a wireless access network.

| List of Reference Symbols in Drawings | |
|---|---|
| Ref. Symbol | Element Name |
| 100 | SLA Process |
| 200 | Rate Limiting Process |
| 300 | Schedule and Contention Control Process |
| 400 | Access Limiting Process |
| 500 | Usage Feedback Process |
| 510-1 | Access Node 1 |
| 510-2 | Access Node 2 |
| 510-3 | Access Node 3 |
| 510-4 | Access Node 4 |
| 510-5 | Access Node 5 |
| 520-1 | Internet Access Link 1 |
| 520-2 | Internet Access Link 2 |
| 530-1 | Client Link 1 |
| 530-2 | Client Link 2 |
| 600-1 | Client Device 1 |
| 600-2 | Client Device 2 |
| 700 | Internet |
| 1000 | Coupled Processes for Providing Differentiated Services in a WAN |
| 2000 | Schedule Map |
| 2000-1 | Time Slot 1 (TS1) |
| 2000-2 | Time Slot 2 (TS2) |
| 2000-N | Time Slot N (TSN) |
| 3000 | Access Node Hardware Aspects |
| 3001.1 | Memory Bank 1 |
| 3001.2 | Memory Bank 2 |
| 3002 | DRAM Memory Interface |
| 3003 | FLASH |
| 3004 | EEPROM |
| 3005 | Processor |
| 3006 | Ethernet Interface |
| 3007 | Ethernet Ports |
| 3008 | PCI Expansion Bus |
| 3009-A | Wireless Interface A |
| 3009-N | Wireless Interface N |
| 4000 | Access Node Software Aspects |
| 4001 | Network Management System Manager |
| 4002 | Network Interface Manager |
| 4003 | Fault, Configuration, Accounting, Performance, and Security Manager |
| 4100 | Kernel Interface |
| 4101 | Routing and Transport Protocols Layer |
| 4102 | Layer-2 Abstraction Layer |
| 4103 | Flash File System Module |
| 4104 | Ethernet Driver |
| 4105 | Radio Driver |
| 4106 | Flash Driver |
| 4200 | Collective Hardware Interfaces |
| 4201 | Ethernet Interface |
| 4202 | Wireless Interface |
| 4203 | FLASH hardware element |
| 5000 | Wireless Access Network |

DETAILED DESCRIPTION

A detailed description of one or more embodiments of the invention is provided below along with accompanying figures illustrating selected details of the invention. The invention is described in connection with the embodiments. It is well established that it is neither necessary, practical, or possible to exhaustively describe every embodiment of the invention. Thus the embodiments herein are understood to be merely exemplary, the invention is expressly not limited to or by any or all of the embodiments herein, and the invention encompasses numerous alternatives, modifications and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Herein we will refer to the devices comprising the wireless service network (of FIG. 5) and enforcing the wireless SLAs as access nodes or Access Points (APs), though we are not limiting ourselves to the currently popular definition of APs, which generally refers to 802.11 APs. In our usage of the term, the APs may be 802.11 APs or any other device providing connectivity to wireless clients, e.g., base stations or mesh nodes. (Illustrative hardware and software architectures of the access nodes are respectively provided by FIGS. 3 and 4.) Each device acting as a client to the wireless access network is using the network through one AP at a time. We say that the client is associated with the AP. The SLAs defined for the internal compliant client devices and are of two types: dedicated and shared. The dedicated SLA attempts to reserve a portion of the bandwidth at an AP for the internal compliant client device (associated with the AP) who is the owner of the dedicated SLA. A shared SLA on the other hand implies that multiple internal compliant devices (each associated with the AP) may be sharing some portion of the bandwidth, and indicates the maximum bandwidth achievable by the client device. While legacy and external devices will not have an actual SLA with the wireless network, it is useful for the AP to conceptually impose a preconfigured target SLA onto internal legacy devices associated with the AP by attempting to limit the amount of bandwidth they can use individually, by type of device, or as a group for example. An SLA can also be determined dynamically based on device or user identification, which can be used to look up stored SLA information.

The 802.11 protocol has two modes for medium access— one is distributed random access (DCF), and the other is a controlled mode by the AP (PCF). In the latter, all the clients that intend to send traffic register their intention with the AP and the AP includes them in a polling list. Then periodically, the AP goes into PCF mode, where it polls (asks) each client in turn if it has traffic to send at which point the client will send some traffic (usually a packet) if it has one to send. If the client has nothing to send at the moment, the time slot is wasted. The AP goes through the whole list of clients every time and in the same order, asking them if they have something to send. It is possible for the AP to give some clients more time slots than others and thus ensure preferential access for some of them (though typically only equal access is implemented). However, if a device is allocated more time slots and it has nothing to send, a larger period of time is wasted. In addition, PCF cannot enforce radio silence, so if there is periodic interference around a client A that always happens in the time slot allocated to it by the AP, client A may never get to transmit and the AP will assume the client has nothing to send.

In contrast, the mechanisms presented here allow devices to have different levels of access to the wireless medium (e.g., some devices have preferential access) while preserving the distributed random access mode of operation of the devices in the network. To do that, we have introduced some "soft scheduling" which provides usage guidelines to the devices within our network rather than absolute air reservations. To perform this scheduling, we use feedback to adapt the time allocated to the different types of devices relative to their level of activity and channel conditions.

Products available in the market today implement SLAs as rate limiting only, i.e., a cap on how much traffic a node can transmit over some period of time (the rest of its packets are dropped). Rate limiting is not enough because differing channel conditions, and contention (different number of nodes with which a node competes for the air) affect each device's ability to gain access to the medium, and so a device that should be more important than another may end up fulfilling less of its SLA than the less important device. To address this issue we add several more components to the solution on top of rate limiting including scheduling, and adaptation based on feedback from the client devices.

When we talk about preferential access, we talk about differentiating between devices not traffic types. In the context of 802.11, priorities refer to differentiation of traffic based on type, e.g., voice packets have a higher priority than video packets, which in turn have a higher priority than best-effort traffic, etc. The setting of contention parameters should be such that a device trying to send a packet which has a higher priority than a packet that another device wants to send should be able get access to the medium first. Each device may be running one or more voice, video and best-effort application and thus have multiple traffic flows of each kind. These kinds of priorities are independent of the mechanisms proposed here. We assign each device a level of service or priority relative to other devices but among devices that are trying to access the air/send a packet, the 802.11-style traffic priorities will be observed.

SLA definition and representation: Because the quality of wireless links varies over time, wireless devices may need to use different modulation rates at different times. In particular, higher modulation rates are possible when link quality is good (low noise level, low loss rate). In order to maintain control over how much wireless resources a device uses, an SLA can be represented as a function of modulation rate, so that regardless of the modulation rate, the amount of air time taken up by a client device is the same. This prevents devices which have poor connectivity from monopolizing network resources and thus taking away airtime from devices which have good connectivity (Abuse Prevention). Example SLA: 0.9 Mbps at 54 Mbps modulation rate, or 0.1 Mbps at 6 Mbps modulation rate. Internal legacy devices can be conceptually treated as having a default target SLA and will be rate limited to not exceed this preconfigured bandwidth.

Bandwidth Allocation: Each AP has a certain capacity. In ideal condition this capacity is the nominal capacity C. When allocating bandwidth to dedicated client devices, we subtract the SLA of the client device (upload+download) from the current estimated available bandwidth. The capacity can be allocated on a first-come first-serve basis, or there can be some minimum allocation for each device type (dedicated, shared and legacy types), or there can be a fixed allocated portion of the bandwidth for each device type.

When allocating bandwidth to a shared client device, we may impose restrictions on when such a device can join by for example only allowing the client device to associate to the AP, if adding the new shared client device will still allow a minimum bandwidth available per shared client device at that AP. For example, if 0.1 Mbps is configured to be the minimum bandwidth for supporting a shared client device, and there is 1 Mbps of bandwidth allocated for shared client devices, only 10 such devices would be allowed to associate. The same rules can be used for legacy devices.

The embodiments discussed elsewhere herein have been of an embodiment class in which each client device is associated with a single AP. In an alternate embodiment class herein referred to as a multi-AP-association class, at least some of the client devices are associated with multiple APs at one time. In a first embodiment of the multi-AP-association class, each client device has a respective actual SLA with each AP to which the client device is associated. In a second embodiment of the multi-AP-association class, the multiple APs associated with a client device jointly enforce a single actual SLA (i.e., at least rate limit the client so that it does not use more than its actual SLA through all the APs together).

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1. A method of providing differentiated services to at least some of a plurality of client devices, each of the client devices being wirelessly coupled to an associated access node of a plurality of access nodes of a wireless access network, the method comprising:

for each of the access nodes, enforcing target service-levels for each of the client devices that are associated with the access node and determining service-type time-slot information for at least some of the client devices that are associated with the access node;

each client device of a compliant-device-class subset of the client devices transmitting in accordance with a respective service-type designation and the service-type time-slot information determined by the client device's associated access node, performing rate-limiting in accordance with the client device's target service-level and providing usage and bandwidth availability feedback to the client device's associated access node; and wherein the service-type time-slot information is at least occasionally updated based at least in part on the feedback.

EC2. The method of EC1, further comprising: at least a particular access node of the access nodes providing preferential access to at least some of the client devices of the compliant-device-class associated with the particular access node at least in part via the particular access node's control over the service-type time-slot information.

EC3. The method of EC1, further comprising: at least a particular access node of the access nodes managing allocation of the particular access node's bandwidth capacity at least in part via selectively restricting associations with at least some of the client devices.

EC4. The method of EC1, further comprising: at least a particular access node of the access nodes managing allocation of the particular access node's bandwidth capacity at least in part via control over the service-type time-slot information.

EC5. The method of EC1, wherein each service-type designation is a mutually-exclusive one of a preferred-service type and a regular-service type.

EC6. The method of EC1, further comprising:
each service-type designation comprising a mutually-exclusive one of a preferred-service type and a regular-service type;
the service-type time-slot information determined by the client device's associated access node comprising a designation of each of a plurality of time-slots as being a mutually-exclusive one of a preferred-service time-slot and a regular-service time-slot; and
each regular-service type client device of the compliant-device-class transmitting only in those time-slots of the plurality of time-slots that are designated as a regular-service time-slot.

EC7. The method of EC6, further comprising:
each preferred-service type client device of the compliant-device-class transmitting only in those time-slots of the plurality of time-slots that are designated as a preferred-service time-slot.

EC8. The method of EC6, further comprising:
each preferred-service type client device of the compliant-device-class transmitting in any of the plurality of time-slots.

EC9. The method of EC6, wherein the client devices of the compliant-device-class are at least partially under the control of a provider operating the wireless access network and are considered internal devices, each preferred-service time-slot is a dedicated time-slot, each regular-service time-slot is a shared time-slot, each preferred-service type client device is a dedicated device of the internal devices, each regular-service type client devices is a shared device of the internal devices.

EC10. The method of EC9, further comprising: providing a dedicated service level agreement (dedicated SLA) between a particular one of the dedicated devices and a provider operating the wireless access network, the dedicated SLA corresponding to the target service-level of the particular one of the dedicated devices.

EC11. The method of EC9, further comprising: providing a shared service level agreement (shared SLA) between a particular one of the shared devices and a provider operating the wireless access network, the shared SLA corresponding to the target service-level of the particular one of the shared devices.

EC12. The method of EC9, further comprising: at least in part controlling the relative distribution of available bandwidth between the dedicated devices and the shared devices by adjusting the relative distribution of the dedicated time-slots and the shared time-slots.

EC13. The method of EC12, further comprising: adjusting the relative distribution of the dedicated time-slots and the shared time-slots at least in part based on changes in activity levels of at least some of the dedicated devices.

EC14. The method of EC13, wherein the fraction of shared time-slots to total time-slots is at least temporarily increased during periods of relative inactivity by at least some of the dedicated devices.

EC15. The method of EC12, further comprising: adjusting the relative distribution of the dedicated time-slots and the shared time-slots at least in part based on changes in capacity realized by at least some of the dedicated devices.

EC16. The method of EC15, wherein the fraction of dedicated time-slots to total time-slots is at least temporarily increased during periods of relatively poor link-quality experienced by at least some of the dedicated devices.

EC17. The method of EC9, further comprising: adjusting the relative distribution of the dedicated time-slots and the shared time-slots in order to control the relative distribution of available bandwidth between the dedicated devices and the shared devices in order to fulfill a service level agreement (SLA).

EC18. The method of EC9, further comprising: adjusting the relative distribution of the dedicated time-slots and the shared time-slots in order to control the relative distribution of available bandwidth between the dedicated devices and the shared devices in order to fulfill a dedicated service level agreement (dedicated SLA) between a particular one of the dedicated devices and a provider operating the wireless access network, the dedicated SLA corresponding to the target service-level of the particular one of the dedicated devices.

EC19. The method of EC9, wherein the service-type time-slot information is an access schedule for the dedicated and shared devices.

EC20. The method of EC9, further comprising: at least a particular access node of the access nodes providing preferential access to at least some of the dedicated devices associated with the particular access node at least in part via establishing reduced contention parameter values for the dedicated devices relative to the contention parameter values for other of the client devices.

EC21. The method of EC1, further comprising: providing a service level agreement (SLA) between a customer associated with a particular one of the client devices and a provider operating the wireless access network, the SLA corresponding to the target service-level of the particular one of the client devices.

EC22. The method of EC1, further comprising: the usage feedback comprising at least one of packet size, modulation rate, backoff durations, and number of retransmissions.

EC23. The method of EC1, wherein the access nodes are access points and the wireless access network is a wireless local area network.

EC24. The method of EC1, wherein the access nodes are access points and the wireless access network is a wireless local area network compatible with at least one version of the 802.11 standard.

EC25. The method of EC1, wherein the access nodes are wireless mesh nodes and the wireless access network is a wireless mesh network.

EC26. The method of EC1, wherein the access nodes are base stations and the wireless access network is a cellular network.

EC27. The method of EC1, further comprising: the client devices comprising at least one device type of the device types comprising wireless-enabled desktops, wireless-enabled servers, wireless-enabled laptops, wireless-enabled tablets, wireless-enabled PDAs, wireless-enabled customer premises equipment (CPE), and wireless-enabled phones.

EC28. The method of EC1, further comprising: the service-type time-slot information comprising a designation of each of a plurality of time-slots as being a mutually-exclusive one of a preferred-service time-slot and a regular-service time-slot.

EC29. The method of EC28, wherein a preferred-service time-slot is a dedicated time-slot and a regular-service time-slot is a shared time-slot.

EC30. The method of EC1, wherein the service-type time-slot information is a schedule map.

EC31. The method of EC1, wherein the service-type time-slot information is a schedule bitmap.

EC32. The method of EC1, wherein the service-type time-slot information is a subset of traffic control information periodically broadcast by the access nodes.

EC33. The method of EC1, wherein at least some of the target service-levels comprise at least a bandwidth allocation.

EC34. The method of EC1, wherein at least some of the target service-levels comprise at least a maximum bandwidth limit.

EC35. The method of EC1, wherein at least some of the target service-levels comprise at least a minimum bandwidth guarantee in at least one direction.

EC36. The method of EC1, wherein at least some of the target service-levels comprise at least a combined-direction total minimum bandwidth guarantee.

EC37. The method of EC1, wherein at least some of the target service-levels comprise at least an air-time allocation.

EC38. The method of EC1, wherein at least some of the target service-levels comprise at least a bandwidth allocation at a particular modulation rate.

EC39. The method of EC1, wherein at least some of the target service-levels comprise at least a first bandwidth allocation at a first modulation rate and a second bandwidth allocation at a second modulation rate.

EC40. The method of EC1, further comprising: for each of the access nodes, performing rate-limiting in accordance with the target service-level of each client device associated with the access node for at least a non-compliant-device-class subset of the client devices associated with the access node.

EC41. The method of EC1, further comprising: for each of the access nodes, performing rate-limiting for at least some of the access-node-associated client devices exceeding their target service-level.

EC42. The method of EC40, further comprising: the access nodes performing at least some of the rate-limiting by dropping packets.

EC43. The method of EC40, further comprising: the access nodes performing at least some of the rate-limiting by delaying packets of conformant traffic.

EC44. The method of EC40, further comprising: the non-compliant-device-class subset comprising non-compliant devices of the client devices that at least sometimes operate contrary to at least one of the reserved time-slot information and the target service-levels respectively corresponding to the non-compliant devices.

EC45. The method of EC40, further comprising: the non-compliant-device-class subset comprising non-compliant legacy devices of the client devices that operate unaware of the reserved time-slot information and the target service-levels respectively corresponding to the non-compliant legacy devices.

EC46. The method of EC40, further comprising: the non-compliant-device-class subset comprising non-compliant devices of the client devices that are unable to operate in accordance with the reserved time-slot information and the target service-levels respectively corresponding to the non-compliant devices.

EC47. The method of EC40, further comprising: the non-compliant-device-class subset comprising non-compliant devices of the client devices that are unwilling to operate in accordance with the reserved time-slot information and the target service-levels respectively corresponding to the non-compliant devices.

EC48. The method of EC1, wherein the compliant-device-class subset and the non-compliant-device-class subset are mutually-exclusive.

EC49. The method of EC1, further comprising: the access nodes communicating with each other wirelessly.

EC50. The method of EC1, further comprising: the access nodes communicating with each other via at least some multi-hop wireless links.

EC51. The method of EC1, further comprising: at least some of the access nodes communicating with each other via a wireless mesh portion of the wireless access network.

EC52. The method of EC1, further comprising: the access nodes communicating with each other via wires.

EC53. The method of EC1, further comprising: the access nodes communicating with each other using a combination of wired and wireless techniques as appropriate to deployment circumstances.

EC54. The method of EC1, further comprising: the access nodes communicating with a central server responsible at least in part for the behavior and configuration of the access nodes.

EC55. The method of EC1, further comprising: the wireless access network providing at least some of the client devices with access to the Internet.

EC56. The method of EC1, further comprising: the wireless access network providing at least some of the client devices with access to one or more network services.

EC57. A system for providing differentiated services to at least some of a plurality of client devices, each of the client devices being wirelessly coupled to an associated access node of a plurality of access nodes of a wireless access network, the system comprising:

each of the access nodes having means for enforcing target service-levels for each of the client devices that are associated with the access node and means for determining service-type time-slot information for at least some of the client devices that are associated with the access node;

each client device of a compliant-device-class subset of the client devices having means for transmitting in accordance with a respective service-type designation and the service-type time-slot information determined by the client device's access node, means for performing rate-limiting in accordance with the client device's target service-level, and means for providing usage and bandwidth availability feedback to the client device's associated access node; and wherein the service-type time-slot information is at least occasionally updated based at least in part on the feedback.

EC58. The system of EC57, further comprising: at least a particular access node of the access nodes having means for providing preferential access to at least some of the client devices of the compliant-device-class associated with the particular access node at least in part via the particular access node having means for control over the service-type time-slot information.

EC59. The system of EC57, further comprising: at least a particular access node of the access nodes having means for managing allocation of the particular access node's bandwidth capacity at least in part via means for selectively restricting associations with at least some of the client devices.

EC60. The system of EC57, further comprising: at least a particular access node of the access nodes having means for managing allocation of the particular access node's bandwidth capacity at least in part via means for control over the service-type time-slot information.

EC61. The system of EC57, wherein each service-type designation is a mutually-exclusive one of a preferred-service type and a regular-service type.

EC62. The system of EC57, further wherein:

each service-type designation comprises a mutually-exclusive one of a preferred-service type and a regular-service type;

the service-type time-slot information determined by the client device's associated access node comprises a designation of each of a plurality of time-slots as being a mutually-exclusive one of a preferred-service time-slot and a regular-service time-slot; and each regular-service type client device of the compliant-device-class transmits only in those time-slots of the plurality of time-slots that are designated as a regular-service time-slot.

EC63. The system of EC62, further wherein:

each preferred-service type client device of the compliant-device-class transmits only in those time-slots of the plurality of time-slots that are designated as a preferred-service time-slot.

EC64. The system of EC62, further wherein:

each preferred-service type client device of the compliant-device-class transmits in any of the plurality of time-slots.

EC65. The system of EC62, wherein the client devices of the compliant-device-class are at least partially under the control of a provider operating the wireless access network and are considered internal devices, each preferred-service time-slot is a dedicated time-slot, each regular-service time-slot is a shared time-slot, each preferred-service type client device is a dedicated device of the internal devices, and each regular-service type client device is a shared device of the internal devices.

EC66. The system of EC65, further comprising: access node means for providing a dedicated service level agreement (dedicated SLA) between a particular one of the dedicated devices and a provider operating the wireless access network, the dedicated SLA corresponding to the target service-level of the particular one of the dedicated devices.

EC67. The system of EC65, further comprising: access node means for providing a shared service level agreement (shared SLA) between a particular one of the shared devices and a provider operating the wireless access network, the shared SLA corresponding to the target service-level of the particular one of the shared devices.

EC68. The system of EC65, further comprising: access node means for at least in part controlling the relative distribution of available bandwidth between the dedicated devices and the shared devices by adjusting the relative distribution of the dedicated time-slots and the shared time-slots.

EC69. The system of EC68, further comprising: access node means for adjusting the relative distribution of the dedicated time-slots and the shared time-slots at least in part based on changes in activity levels of at least some of the dedicated devices.

EC70. The system of EC69, wherein the fraction of shared time-slots to total time-slots is at least temporarily increased during periods of relative inactivity by at least some of the dedicated devices.

EC71. The system of EC68, further comprising: access node means for adjusting the relative distribution of the dedicated time-slots and the shared time-slots at least in part based on changes in capacity realized by at least some of the dedicated devices.

EC72. The system of EC71, wherein the fraction of dedicated time-slots to total time-slots is at least temporarily increased during periods of relatively poor link-quality experienced by at least some of the dedicated devices.

EC73. The system of EC65, further comprising: access node means for adjusting the relative distribution of the dedicated time-slots and the shared time-slots in order to control the relative distribution of available bandwidth between the dedicated devices and the shared devices in order to fulfill a service level agreement (SLA).

EC74. The system of EC65, further comprising: access node means for adjusting the relative distribution of the dedicated time-slots and the shared time-slots in order to control the relative distribution of available bandwidth between the dedicated devices and the shared devices in order to fulfill a dedicated service level agreement (dedicated SLA) between a particular one of the dedicated devices and a provider operating the wireless access network, the dedicated SLA corresponding to the target service-level of the particular one of the dedicated devices.

EC75. The system of EC65, wherein the service-type time-slot information is an access schedule for the dedicated and shared devices.

EC76. The system of EC65, further comprising: at least a particular access node of the access nodes having means for providing preferential access to at least some of the dedicated devices associated with the particular access node at least in part via means for establishing reduced contention parameter values for the dedicated devices relative to the contention parameter values for other of the client devices.

EC77. The system of EC57, further comprising: access node means for providing a service level agreement (SLA) between a customer associated with a particular one of the client devices and a provider operating the wireless access network, the SLA corresponding to the target service-level of the particular one of the client devices.

EC78. The system of EC57, further wherein: the usage feedback comprises at least one of packet size, modulation rate, and number of retransmissions.

System and Operation

Rate Limiting

The download and upload bandwidth are going to be rate limited to the SLA (actual SLA or conceptual target SLA, as appropriate) of each device. The AP will limit the bandwidth usage of a client device (associated with the AP) in each direction, dropping packets before transmitting them to the client (in the download direction), and dropping packets from the client before sending them on towards the Internet, whenever the client has exceeded its SLA. Compliant client devices (associated with the AP) will perform rate limiting as well in order to conserve the wireless bandwidth. Rate limiting can also include traffic shaping where packets are delayed rather than dropped. Shaping techniques are particularly useful for rate limiting conformant traffic, e.g., TCP.

Bandwidth Usage Control

Figure 2:
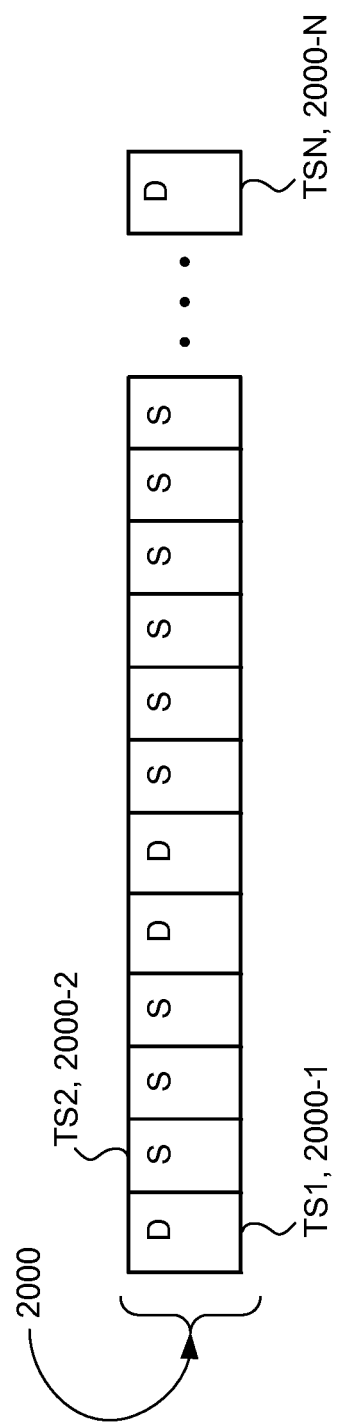
FIG. 2 illustrates selected details of an embodiment of a schedule map, including time-slots designated as being dedicated (D) and shared (S).

Each AP can periodically broadcast a schedule map announcing which type of device is allowed to transmit during each time unit within a time period T (e.g., a second), where a time unit can be defined as some number of milliseconds. For example, if there are dedicated devices associated to an AP with SLAs totaling 5 Mbps, and the AP's total capacity is 20 Mbps, then 25% of the time slots will be announced as dedicated slots (indicating dedicated client devices are allowed to transmit within each such a time slot) and 75% of the time slots are going to be shared time slots (indicating that shared client devices can transmit within each such time slot). In some embodiments, the schedule map is conceptually as illustrated in FIG. 2, where each time slot is marked with D for dedicated and S for shared. The schedule map in various embodiments is implemented as a bitmap, wherein for example, dedicated time-slots are represented by a logical true or "1" value and shared time-slots are represented by a logical false or "0" value, or vice versa.

The periodic broadcasting of the schedule map can be combined with other periodic control traffic transmissions, e.g., piggybacked on beacon packets that are typically used in wireless access networks today.

In some embodiments, in order to provide even better service to selected dedicated devices, at least some of the dedicated devices are configured to transmit in any time slot. The shared devices continue to be restricted to transmit during the shared time slots as indicated by the schedule bitmap. Thus, those devices unrestricted by the schedule bitmap are enabled to have increased access.

Non-compliant devices with respect to a particular AP, such as internal legacy devices, external legacy devices, and other external devices, will be transmitting without regard to the schedule bitmap, or potentially at any time. Since internal legacy devices associated with the AP will be rate limited by the AP, if they are using a conformant communication protocol (e.g., TCP), they will gradually adapt their traffic rate to the available/rate limited bandwidth, and their bandwidth usage will thus be indirectly responsive to control by the AP.

The schedule map needs to ensure that no sequence of consecutive dedicated or shared time slots exceeds a certain length L, in order to ensure that high priority packets (e.g., voice packets) will not experience excessive delays.

Contention Management

By scheduling the different types of devices to transmit in accordance with the scheduled time slots, contention in the network is reduced, since a smaller number of devices will compete to transmit at any given time. In addition, dedicated client devices may be given prioritized access to the wireless medium relative to shared client devices and legacy client devices, e.g., by reducing their contention parameter values (e.g., inter-frame spacing and contention window sizes).

In certain embodiments, the contention parameter values are modified in order to further distinguish between dedicated and shared devices, but only so long as that can be done without affecting the 802.11 traffic priorities: it should not be the case that modifications to the contention window values lead to a device's video traffic gaining access to the medium before another device's voice traffic when both devices are trying to access the medium at the same time.

According to embodiment, in order to ensure that client devices only transmit in their own type of time slot, a number of mechanisms are selectively employed:

a) client devices are time synchronized with the AP in order to make sure they have a common understanding of when the announced schedule begins; and b) packets of one type, e.g., for/from dedicated devices, that happen to be queued for transmission at the time a dedicated slots ends and a shared slot begins, are not transmitted as they will be sent in the wrong time slot and take away bandwidth from the other type of devices.

Each type of device can have packets with different priorities that can be treated according to their priority, e.g., different contention parameters and queuing may be applied to each priority level (as is currently employed by the 802.11e amendment to the 802.11 standard).

Adjustment of Estimates Based on Feedback

Client devices can track their own usage and periodically report it to the AP to which they are associated, along with how much traffic they wanted to send (within the limits of their SLA), which would be used to indicate whether the devices are getting sufficient bandwidth and to track their actual bandwidth demands. The usage computation may utilize the following: packet size, modulation rate, number of retransmissions, and backoff durations.

If some dedicated client devices are inactive for some time or are underutilizing their allocation for some time, the AP will temporarily set their adjusted target SLA to zero and revise the access schedule to allocate their bandwidth to the shared client devices, and the bitmap schedule will be recomputed accordingly. Once the utilization of these dedicated devices goes up, their adjusted target SLA is restored to their nominal target SLA, and the schedule is again adjusted to accommodate them.

Adjustments due to changes in capacity are also performed, e.g., when the quality of a link becomes worse. If dedicated client devices are not getting sufficient bandwidth to fulfill their SLAs, the access schedule can be revised to allocate more time slots to them.

Node Hardware and Software

Figure 3:
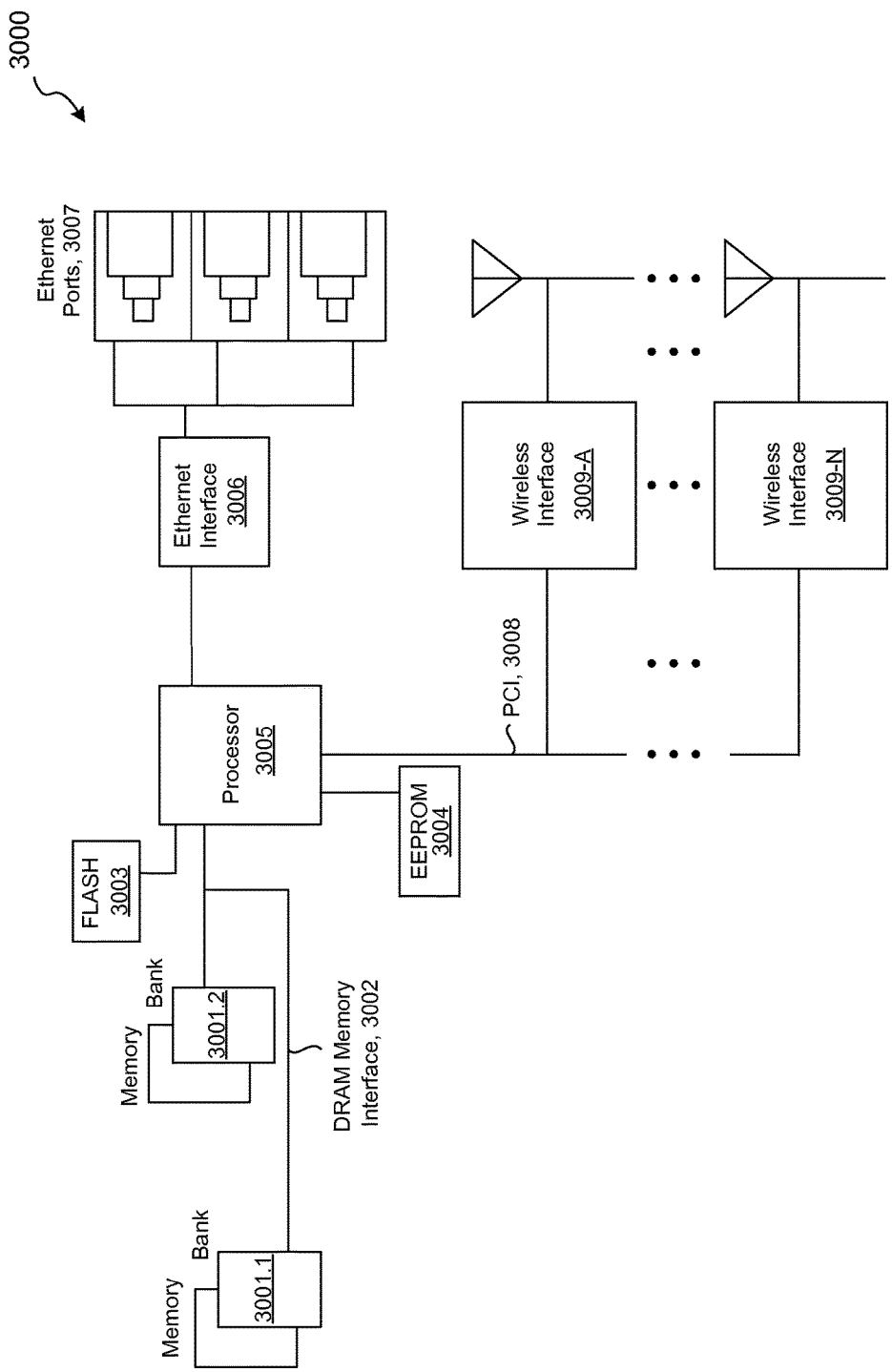
FIG. 3 illustrates selected details of an embodiment of an access node from a hardware architecture perspective.

FIG. 3 illustrates selected details of hardware aspects of an embodiment of an access node. The illustrated access node includes Processor 3005 processor coupled to various types of storage, including volatile read/write memory "Memory Bank" elements 3001.1 and 3001.2 via a DRAM Memory Interface 3002 memory interface, and non-volatile read/write memory FLASH 3003 and EEPROM 3004 elements. The processor is further coupled to an Ethernet Interface 3006 providing a plurality of Ethernet ports 3007 for establishing wired links, and a Wireless Interfaces 3009-A through 3009-N providing radio communication of packets for establishing wireless links. In some embodiments the Wireless Interface is compatible with an IEEE 802.11 wireless communication standard or amendment (including but not limited to any of 802.11-2007, 802.11a, 802.11b, 802.11g, 802.11e, and 802.11n). The illustrated partitioning is only one example, as other equivalent embodiments of an access node are possible. The illustrated access node may function as any one of the nodes illustrated in FIG. 5.

In operation the processor fetches instructions from any combination of the storage elements (DRAM, FLASH, and EEPROM) and executes the instructions. Some of the instructions correspond to software associated with the various operations discussed previously: establishing and updating target service-levels, rate limiting, schedule map creation and updating, collection and analysis of usage feedback, and the other aspects detailed throughout for providing differentiated services to preferred devices.

Figure 4:
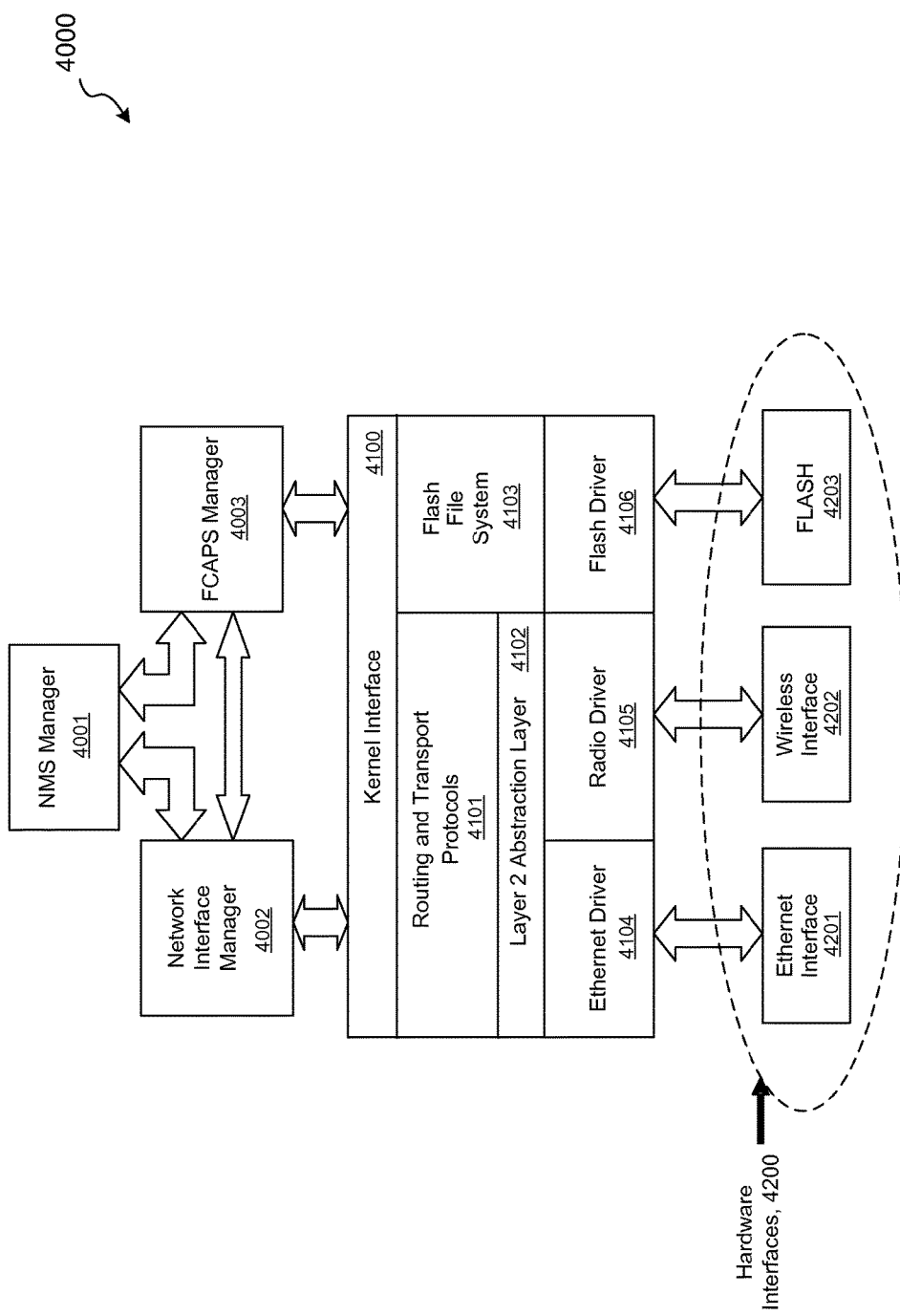
FIG. 4 illustrates selected details of an embodiment of an access node from a software architecture perspective.
Figure 5:
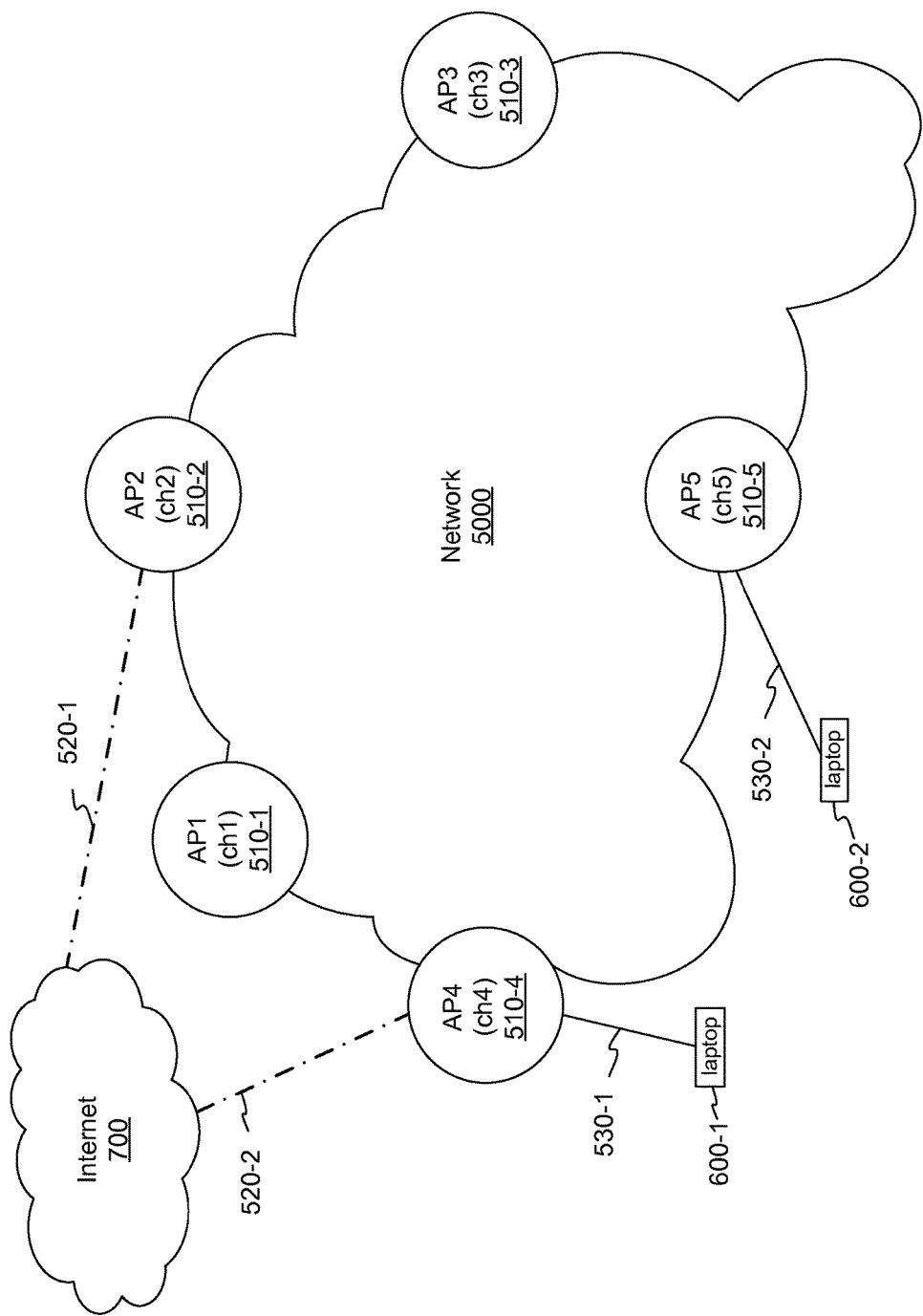
FIG. 5 illustrates selected details of an embodiment of a wireless access network, including a number of access nodes, client devices, and Internet access.

FIG. 4 illustrates selected details of software aspects of an embodiment of a node. The illustrated software includes a Network Management System (NMS) Manager 4001 interfacing to a Network Interface Manager 4002 and a Fault, Configuration, Accounting, Performance, and Security (FCAPS) Manager 4003. In some embodiments the NMS interfaces between management software operating external to the node and software operating internal to the node (such as various applications and FCAPS). The Network Interface Manager manages physical network interfaces (such as the Ethernet and Wireless Interfaces of a node). The Network Interface Manager assists the NMS in passing dynamic configuration changes (as requested by a user) through the management software to FCAPS. In some embodiments FCAPS includes functions to store and retrieve configuration information, and FCAPS functions serve all applications requiring persistent configuration information. FCAPS may also assist in collecting fault information and statistics and performance data from various operating modules of the node. FCAPS may pass any portion of the collected information, statistics, and data to the NMS.

A Kernel Interface 4100 interfaces the Managers to a Routing and Transport Protocols layer 4101 and a Flash File System module 4103. The Routing Protocols include the bridge link protocol and portions of software relating to maintenance of and reference to a bridge table. The Transport Protocols include TCP and UDP. The Flash File System module interfaces to a Flash Driver 4106 that is illustrated conceptually coupled to a FLASH hardware element 4203 that is representative of a flash file system stored in any combination of the FLASH 3003 and EEPROM 3004 elements of FIG. 3. A Layer-2 Abstraction Layer 4102 interfaces the Routing and Transport Protocols to Ethernet and Radio Drivers 4104 and 4105, respectively. The Ethernet Driver is illustrated conceptually coupled to Ethernet Interface 4201 that is representative of any combination of the Ethernet Interface 3006 of FIG. 3 and other software compatible interfaces. The Radio Driver is illustrated conceptually coupled to Wireless Interface 4202 that is representative of any combination of the Wireless Interface elements 3009-A through 3009-N of FIG. 3. In some embodiments the software may also include a serial driver. The software is stored on a computer readable medium (e.g. any combination of the DRAM, FLASH, and EEPROM elements), and is executed by the processor. The illustrated partitioning is an example only, as many other equivalent arrangements of layers are possible.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (i.e., the callouts or numerical designators) used to identify and reference the features and elements of the embodiments.

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications, are merely those of the described embodiments, are expected to track improvements and changes in implementation technology, and should not be construed as limitations.

Functionally equivalent techniques known in the art are employable instead of those described to implement various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design comprise insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method comprising:
wirelessly coupling each of a plurality of client devices to an associated access node of a plurality of access nodes of a wireless access network;
each client device of a compliant-device-class subset of the client devices transmitting in accordance with a respective service-type designation, each service-type designation comprising a mutually-exclusive one of a preferred-service type and a regular-service type;
in each of the access nodes, determining service-type time-slot information comprising a respective designation of each of a plurality of time-slots as being a mutually-exclusive one of a preferred-service time-slot and a regular-service time-slot;
in each of the access nodes, providing the respective designations as a schedule map to the compliant-device-class subset of the client devices associated with the respective access node, the schedule map comprising a respective indicator for each of the time-slots, each respective indicator enabled to indicate the respective time-slot as being designated as a mutually exclusive one of a preferred-service time-slot and a regular-service time-slot; and
each regular-service type client device of the compliant-device-class transmitting, responsive to the schedule map provided by the access node the respective regular-service type client device of the compliant-device-class is associated with, only in those time-slots of the plurality of time-slots that are designated as a regular-service time-slot according to the respective indicators.

2. The method of claim 1, further comprising at least a particular access node of the access nodes providing preferential access to at least some of the client devices of the compliant-device-class associated with the particular access node at least in part via the determining service-type time-slot information in the particular access node.

3. The method of claim 1, wherein the client devices of the compliant-device-class are at least partially under control of a provider operating the wireless access network and are considered internal devices, each preferred-service time-slot is a dedicated time-slot, each regular-service time-slot is a shared time-slot, each preferred-service type client device is a dedicated device of the internal devices, and each regular-service type client device is a shared device of the internal devices.

4. The method of claim 3, further comprising providing a shared service level agreement (shared SLA) between a particular one of the shared devices and the provider, the shared SLA corresponding to a target service-level of the particular one of the shared devices and indicating a maximum bandwidth achievable by the particular shared device.

5. The method of claim 3, further comprising at least in part controlling relative distribution of available bandwidth between the dedicated devices and the shared devices by adjusting relative distribution of the dedicated time-slots and the shared time-slots.

6. The method of claim 5, further comprising adjusting the relative distribution of the dedicated time-slots and the shared time-slots at least in part based on changes in activity levels of at least some of the dedicated devices.

7. The method of claim 5, further comprising adjusting the relative distribution of the dedicated time-slots and the shared time-slots at least in part based on changes in capacity realized by at least some of the dedicated devices.

8. The method of claim 7, wherein the fraction of dedicated time-slots to total time-slots is at least temporarily increased during periods of relatively poor link-quality experienced by at least some of the dedicated devices.

9. The method of claim 3, further comprising adjusting relative distribution of the dedicated time-slots and the shared time-slots to control relative distribution of available bandwidth between the dedicated devices and the shared devices to fulfill a dedicated service level agreement (dedicated SLA) between a particular one of the dedicated devices and a provider operating the wireless access network, the dedicated SLA corresponding to a target service-level of the particular one of the dedicated devices.

10. The method of claim 1, further comprising each client device of the compliant-device subset performing rate-limiting in accordance with a respective target service level.

11. The method of claim 1, further comprising each client device of the compliant-device subset providing at least one of bandwidth availability and usage as feedback to the access node associated with the respective client device.

12. The method of claim 11, further comprising updating the service-type time-slot information based in part on the feedback.

13. The method of claim 1, wherein at least one of the access nodes comprises at least one of a base station and a mesh node.

14. The method of claim 1, wherein at least one of the client devices comprises at least one of a laptop, a PDA, and one or more Customer Premises Equipment devices (CPEs).

15. The method of claim 1, further comprising assigning relative respective priorities to at least a portion of the client devices.

16. A system comprising:
means for wirelessly coupling each of a plurality of client devices to an associated access node of a plurality of access nodes of a wireless access network;
means for transmitting, in accordance with a respective service-type designation and comprised in each client device of a compliant-device-class subset of the client devices, each service-type designation comprising a mutually-exclusive one of a preferred-service type and a regular-service type;
means for determining service-type time-slot information comprised in each of the access nodes, the service-type time-slot information comprising a respective designation of each of a plurality of time-slots as being a mutually-exclusive one of a preferred-service time-slot and a regular-service time-slot;

in each of the access nodes, means for providing the respective designations as a schedule map to the compliant-device-class subset of the client devices associated with the respective access node, the schedule map comprising a respective indicator for each of the time-slots, each respective indicator enabled to indicate the respective time-slot as being designated as a mutually exclusive one of a preferred-service time-slot and a regular-service time-slot; and wherein each regular-service type client device of the compliant-device-class is enabled to transmit, responsive to the schedule map provided by the access node the respective regular-service type client device of the compliant-device-class is associated with, only in those time-slots of the plurality of time-slots that are designated as a regular-service time-slot according to the respective indicators.

17. The system of claim 16, further comprising, in at least a particular access node of the access nodes, means for providing preferential access to at least some of the client devices of the compliant-device-class associated with the particular access node at least in part via the determining service-type time-slot information in the particular access node.

18. The system of claim 16, wherein the client devices of the compliant-device-class are at least partially under control of a provider operating the wireless access network and are considered internal devices, each preferred-service time-slot is a dedicated time-slot, each regular-service time-slot is a shared time-slot, each preferred-service type client device is a dedicated device of the internal devices, and each regular-service type client device is a shared device of the internal devices.

19. The system of claim 18, further comprising means for providing a shared service level agreement (shared SLA) between a particular one of the shared devices and the provider, the shared SLA corresponding to a target service-level of the particular one of the shared devices and indicating a maximum bandwidth achievable by the particular shared device.

20. The system of claim 18, further comprising means for at least in part controlling relative distribution of available bandwidth between the dedicated devices and the shared devices by adjusting relative distribution of the dedicated time-slots and the shared time-slots.

21. The system of claim 20, further comprising means for adjusting the relative distribution of the dedicated time-slots and the shared time-slots at least in part based on changes in activity levels of at least some of the dedicated devices.

22. The system of claim 20, further comprising means for adjusting the relative distribution of the dedicated time-slots and the shared time-slots at least in part based on changes in capacity realized by at least some of the dedicated devices.

23. The system of claim 22, wherein the fraction of dedicated time-slots to total time-slots is at least temporarily increased during periods of relatively poor link-quality experienced by at least some of the dedicated devices.

24. The method of claim 1, wherein the schedule map is implemented as a bitmap, and each respective indicator comprises a bit.

25. The system of claim 16, wherein the schedule map is implemented as a bitmap, and each respective indicator comprises a bit.

* * * * *